United States Patent [19]
LeSchack

[11] 3,803,588
[45] Apr. 9, 1974

[54] GRAPHICAL DATA DIGITIZER

[76] Inventor: Leonard A. LeSchack, 1111 University Blvd. West, Silver Spring, Md. 20902

[22] Filed: Sept. 15, 1971

[21] Appl. No.: 180,712

[52] U.S. Cl. ......... 340/347 R, 235/61.6 A, 33/1 M, 33/1 C
[51] Int. Cl. .......................................... H03k 13/02
[58] Field of Search...... 340/347 AD, 347 P, 347 R, 340/146.3; 318/576, 577; 235/61.6 A; 33/1 M, 1 C

[56] References Cited
UNITED STATES PATENTS

| | | | |
|---|---|---|---|
| 3,518,416 | 6/1970 | Gebel et al. | 33/1 C X |
| 3,253,273 | 5/1966 | Allen et al. | 235/61.6 A X |
| 3,027,079 | 3/1962 | Fletcher et al. | 340/347 X |
| 3,473,157 | 10/1969 | Little et al. | 318/577 |
| 2,999,315 | 9/1961 | Benson | 33/1 M |
| 3,505,670 | 4/1970 | Cone et al. | 33/1 M X |
| 3,527,926 | 9/1970 | Holy | 235/61.6 A |

OTHER PUBLICATIONS

Gerber Scientific Instrument Co., Spec. Sheets on Models R-Z-M, R-Z-E, A. (1959)

Primary Examiner—Charles D. Miller
Attorney, Agent, or Firm—Gilbert L. Wells

[57] ABSTRACT

This invention relates to apparatus for the conversion of analog chart data to a digital format acceptable to a computer terminal or the like for subsequent digital processing. The graphical data is traced by a sighting device which generates representational voltages. These voltages are converted electrically into a digital format for subsequent processing.

6 Claims, 1 Drawing Figure

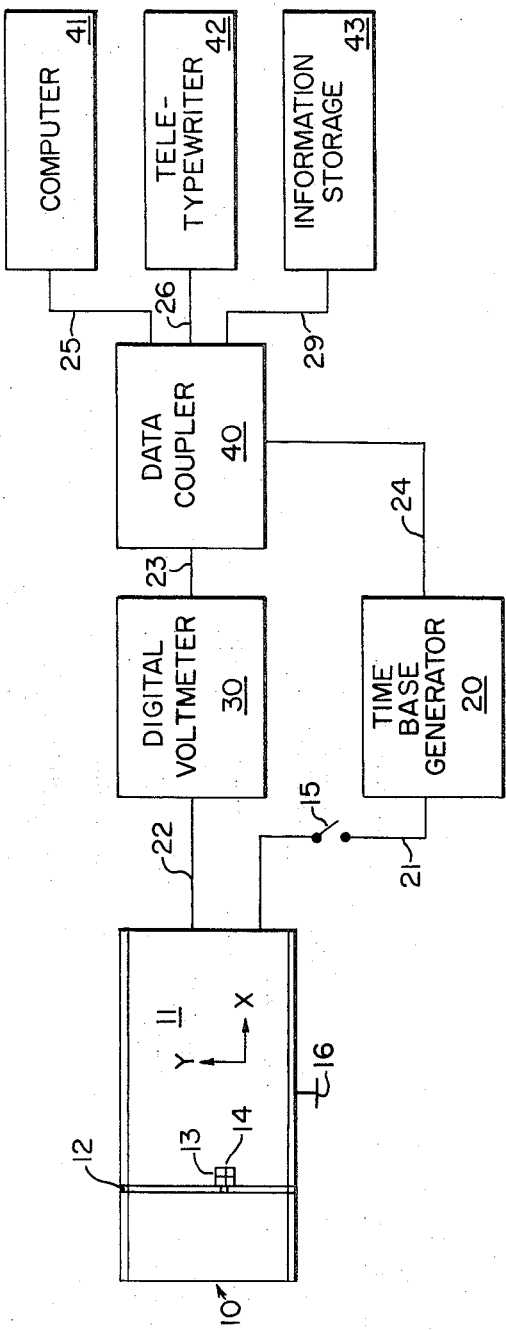

3,803,588

GRAPHICAL DATA DIGITIZER

BACKGROUND OF THE INVENTION

1. Field of the Invention

This invention directed to apparatus for converting graphical data in analog form into data in digital form, and, more particularly into data in digital form suitable for processing by digital computer.

2. Description of the Prior Art

A wide variety of scientific information is obtained in graphical form on sheets of paper, rolls of paper, photographs and the like. Further, it is quite common for such graphical data to be in analog form which must undergo digitalization before such data is suitable for numerical analysis by a digital computer. Exemplary sources of such scientific information is the information obtained from sonar depth studies, airborne laser depth studies, oil well logs, map contours, electrical wave forms, x-ray crystalinity data and the like. Heretofore such data could be digitalized only through the use of complex machines employing delicate and expensive digital encoders as shown in U.S. Pat. 3,505,670 to Cone et al., issued Apr. 7, 1970, or especially by plotting the graphs on analog graph paper and then laboriously counting the number of included squares.

SUMMARY OF THE INVENTION

In accordance with the present invention, a line follower is employed to follow the plot of the graphical data being converted. The line follower includes a movable sighting unit including a crosshair. The sighting unit is driven in the X direction at a constant, preset speed. The sighting unit is movable in the Y direction in response to manual operation of a potentiometer by the operator. Thus, the operator is able by manual control of a single potentiometer to keep the crosshair of the sighting unit aligned with the curve being converted. The voltage across the potentiometer is measured and represents the electrical equivalent of the original data. When the graphical data is in analog form, the electrical equivalent can be fed into an analog/digital converter and the resulting data will be in digital form, suitable for further processing. The accuracy of the present invention is within ±5 percent which is within the accuracy of the information obtained in graphical form by conventional means.

The speed of travel of the sighting unit in the X direction should be constant. This speed can be governed by the inherent speed of the plotting device or can be controlled by a time base generator which can be used to create a synthetic time series which is particularly useful for subsequent computer analysis.

The output of the graphical data digitizer can be connected directly to a computer terminal. In addition, the data can be fed to magnetic tape or disk information storage means. If it is desired to have continuous monitoring of the converted information, the data can be fed to teletypewriter means.

DESCRIPTION OF THE DRAWING

FIG. 1 is a block diagram illustrative of the system of the present invention.

DESCRIPTION OF THE PREFERRED EMBODIMENT

Referring to FIG. 1, there is shown an X–Y plotter 10 having a plotting surface 11 upon which the sheet containing graphical data is placed. The plotter 10 is provided with a sliding arm 12 which travels across the plotting surface 11 in the X direction at a constant velocity. A time base generator 20 is connected by circuit 21 to the plotter 10 to control and regulate the speed of the sliding arm 12 in the X direction. The sliding arm 12 is provided with a sighting unit 13 which contains a crosshair 14. The sighting unit 13 is displaceable in the Y direction along the sliding arm 12 under action of a motor (not shown). The direction and amount of displacement of the sighting unit 13 along the sliding arm 12 is controlled manually by control 16 which can be in the form of a potentiometer. The plotter unit 10 is similar in construction to any standard X–Y plotter such as the Hewlett-Packard Model 7005B but the function is reversed. The stylus of such plotter is replaced with the sighting unit 13 and the Y adjust control serves as the control 16.

Data from the plotter 10 is fed by circuit 22 to a standard digital voltmeter 30 where the analog signal from the plotter 10 is transposed to digital form. The Hewlett-Packard Model 3440A/3441A Digital Voltmeter has been found to be satisfactory for this function.

The digital information from the voltmeter 30 is passed via circuit 23 to a data coupler 40, where the digital data is placed in binary coded data form for subsequent use or storage. The time base generator 20 is connected by circuit 24 to the data coupler 40 to provide an input of the synthetic time base selected. Hewlett-Packard Model 2547A Data Coupler has been found to be satisfactory for this unit 40.

Depending on the desired function of the information, the signal from the data coupler 40 can be fed via a circuit 25, 26 or 27 to a computer terminal 41, a teletypewriter 42 or to magnetic information storage means 43.

A switch 15 is provided in circuit 21 between the time base generator 20 and the plotter 10. This switch 15 permits the drive in the X direction of the sliding arm 12 to be interrupted at will to enable the operator to reset the sliding arm 12 manually after the graph has been plotted.

In the operation of the device of the present invention, the graph to be studied is placed on the plotting surface 11. The sliding arm 12 is retracted to the left side of the plotting unit 10. The sighting unit 13 is positioned over the graph line by manipulation of the control 16. The switch 15 is closed initiating movement of the sliding arm 12 in the X direction at a constant velocity as predetermined by the time base generator 20. As the sliding arm 12 moves in the X direction, the crosshairs 14 of the sighting unit 13 are maintained in position over the graph line by manipulation of the control 16. The voltage across the potentiometer forming a part of the control 16 is transmitted by circuit 22 to the digital voltmeter 30 where the voltage is translated into a digital voltage signal. The signal thus generated travels to the data coupler 40 by circuit 23 where it is compared against the signal from the time base generator 20 which passes through circuit 24 to obtain binary coded data which in turn is fed out for subsequent use and/or storage.

I claim:

1. A graphical data digitizer using an X–Y plotter wherein the function is reversed comprising a plotting surface for receiving and supporting data in graph form, an arm slidably mounted on said plotting surface for movement thereacross in the X direction, sighting means slidably mounted on said sliding arm for movement therealong in the Y direction, time base generator means connected to said sliding arm for controlling the velocity thereof, potentiometer control means connected to said sighting means for selectively positioning same in the Y direction along said sliding arm, digital voltmeter means connected across said potentiometer control means whereby the analog voltage of said control means is converted into a digital voltage and a signal representative of the digital voltage is generated thereby, data coupler means connected to said digital voltmeter means for receiving the signal generated thereby, said data coupler means further connected to said time base generator means for receiving a signal generated thereby and including transmission means to produce a signal in binary coded decimal form.

2. A graphical data digitizer as set forth in claim 1, including switch means connected between said time base generator means and said sliding arm.

3. A graphical data digitizer as set forth in claim 2, including computer means connected to said data coupler means for receiving the signal produced thereby.

4. A graphical data digitizer as set forth in claim 2, including teletypewriter means connected to said data coupler means for visually indicating the signal produced thereby.

5. A graphical data digitizer as set forth in claim 2, including magnetic information storage means connected to said data coupler means for receiving and storing the signal produced thereby.

6. A graphical data digitizer as set forth in claim 2, wherein said sighting means includes a crosshair.

* * * * *